United States Patent
Jang

(10) Patent No.: US 11,261,659 B2
(45) Date of Patent: Mar. 1, 2022

(54) CORDLESS BLIND DEVICE

(71) Applicant: WINTEC KOREA INC., Gwangju-si (KR)

(72) Inventor: Seong-Ryong Jang, Seoul (KR)

(73) Assignee: WINTEC KOREA INC., Gwangju-si (KR)

( * ) Notice: Subject to any disclaimer, the term of this patent is extended or adjusted under 35 U.S.C. 154(b) by 49 days.

(21) Appl. No.: 16/958,847

(22) PCT Filed: Jan. 4, 2019

(86) PCT No.: PCT/KR2019/000163
§ 371 (c)(1),
(2) Date: Jun. 29, 2020

(87) PCT Pub. No.: WO2019/139306
PCT Pub. Date: Jul. 18, 2019

(65) Prior Publication Data
US 2021/0032931 A1 Feb. 4, 2021

(30) Foreign Application Priority Data
Jan. 9, 2018 (KR) .................. 10-2018-0002823

(51) Int. Cl.
*E06B 9/72* (2006.01)
*E06B 9/42* (2006.01)
(Continued)

(52) U.S. Cl.
CPC .................. *E06B 9/72* (2013.01); *E06B 9/42* (2013.01); *F16H 1/28* (2013.01);
(Continued)

(58) Field of Classification Search
CPC ...... E06B 9/72; E06B 9/42; E06B 2009/6818; E06B 2009/725; F16H 1/28; F16H 2001/289
(Continued)

(56) References Cited

U.S. PATENT DOCUMENTS

| 9,896,882 B2 * | 2/2018 | Mullet | H04M 1/72415 |
| 2016/0208551 A1 * | 7/2016 | Huang | E06B 9/60 |
| 2017/0081914 A1 * | 3/2017 | Wu | E06B 9/266 |

FOREIGN PATENT DOCUMENTS

| JP | 3149752 U | 4/2009 |
| JP | 2013-520595 A | 6/2013 |

(Continued)

*Primary Examiner* — Beth A Stephan
(74) *Attorney, Agent, or Firm* — Novick, Kim & Lee, PLLC; Jae Youn Kim

(57) ABSTRACT

A cordless blind device that can be operated in various types such as manual, semiautomatic, and automatic types is proposed. The cordless blind device includes: a winding roll, a screen, a driving motor, a weight connected to a lower end of the screen; a torsion spring applying torque in a direction in which the screen is wound; and a rotation conversion module transmitting power in two directions between the driving motor and the winding roll, in which when the driving motor does not generate driving force, the torque applied by the torsion spring, the torque applied by the weight, and resistance by the rotation conversion module and the driving motor make equilibrium, so the screen remains stopped, and when an external force is applied upward or downward to the weight, the equilibrium of the forces breaks, so the screen is wound on or unwound from the winding roll.

10 Claims, 12 Drawing Sheets

(51) Int. Cl.
  *F16H 1/28*    (2006.01)
  *E06B 9/68*    (2006.01)
(52) U.S. Cl.
  CPC . *E06B 2009/6818* (2013.01); *E06B 2009/725* (2013.01); *F16H 2001/289* (2013.01)
(58) Field of Classification Search
  USPC .......................................................... 160/310
  See application file for complete search history.

(56) References Cited

FOREIGN PATENT DOCUMENTS

| | | | | |
|---|---|---|---|---|
| KR | 20-0480955 Y1 | 7/2016 | | |
| KR | 10-2017-0105568 A | 9/2017 | | |
| KR | 10-1774567 B1 | 9/2017 | | |
| KR | 20180057499 A * | 5/2018 | ............... | E06B 9/42 |
| WO | WO-2019135638 A1 * | 7/2019 | ............... | E06B 9/74 |

* cited by examiner

CORDLESS BLIND DEVICE

TECHNICAL FIELD

The present invention relates to a cordless blind device that operates without a pulling string (a cord) and, more particularly, a cordless blind device that can be conveniently operated in various types such as manual, semiautomatic, and automatic types.

BACKGROUND ART

A blind device is installed around a window and used to open/close the window. A blind device has a structure that can adjust the covered amount of a window, so it is possible to control the amount of light using a blind device. A blind device can be used not only to control the amount of light, etc., as described above, but also as a decoration for decorating the interior by being installed around a window. A blind device may include a shield such as a screen, a slat, or the like.

A screen, which is one of the shields widely used for blind devices, is made of a fabric, etc. It is possible to control the covered amount by rolling or unrolling such a screen on and from a roll. As described above, a blind device including a screen needs a structure for rotating the roll on which the screen is rolled. Since a roll is installed high over the top of a window, it is possible to rotate the roll by applying tension using a pulling string (a cord) going down to the bottom of the window.

That is, a pulling string, etc. were generally used as a structure for operating blind devices in the related art. Such a pulling string has only to be connected to a roll to be able to rotate the roll by applying tension, so it can be relatively simply installed and used. However, when a pulling string is long, it acts as an obstacle, so an accident such as falling-down of a person may occurs, and when the pulling string is operated, tension may concentrate only at a side of a roll and malfunction may be generated in many cases. Further, when a pulling string is not surely connected, an excessive force is unnecessarily required to operate the pulling string. Accordingly, there is a need for a structure that can more conveniently operate a blind device.

CITATION LIST

Patent Literature

[Patent Literature 1]
Korean Utility Model No. 20-0480955 (2016.07.29)

SUMMARY OF INVENTION

Technical Problem

In order to solve the problems described above, an object of the present invention is to provide a cordless blind device that can be conveniently operated without a pulling string (a cord), and particularly, can be operated in various types such as manual, semiautomatic, and automatic types.

The object of the present invention is not limited to those described above and other objects may be made apparent to those skilled in the art from the following description.

Solution to Problem

A cordless blind device according to the present invention includes: a winding roll coupled to a rotary shaft; a screen being wound on or unwound from the winding roll; a driving motor winding or unwinding the screen by providing rotational driving force to the winding roll; a weight connected to a lower end of the screen and applying torque to the winding roll using gravity in a first direction in which the screen is unwound; a torsion spring applying torque in a second direction in which the screen is wound by applying elasticity to the winding roll; and a rotation conversion module coupled between the driving motor and the winding roll and transmitting power in two directions by transmitting rotational force provided from the driving motor to the winding roll or transmitting torque provided from the torsion spring to the winding roll, in which when the driving motor does not generate driving force, the torque applied by the torsion spring, the torque applied by the weight, and resistance by the rotation conversion module and the driving motor make equilibrium, so the screen remains stopped, and when an external force is applied upward or downward to the weight, the equilibrium of the forces breaks, so the screen is wound on or unwound from the winding roll.

The torque applied by the torsion spring may be set larger than a resultant force of friction resistance of the rotation conversion module and regenerative resistance of the driving motor.

The rotation conversion module may include a first rotary element connected to the driving motor to rotate together, a second rotary module connected to the winding roll to rotate, and an intermediate rotary unit disposed between the first rotary element and the second rotary element to transmit power.

The first rotary element and the second rotary module may be coaxially arranged, and the intermediate rotary unit may reduce and transmit a rotational speed of the first rotary element to the second rotary element.

The first rotary element may include: a first sun gear; the intermediate rotary unit includes a plurality of first planetary gears revolving around the first sun gear, a first rotary plate to which rotary shafts of the first planetary gears are coupled, and a second sun gear coupled to a side opposite to the side to which the first planetary gears are coupled of the first planetary plate; and the second rotary element includes a plurality of second planetary gears revolving around the second sun gear and a second rotary plate to which the rotary shafts of the second planetary gears are coupled.

The cordless blind device may further include a ring gear to which the first planetary gears and the second planetary gears are both inscribed.

The cordless blind device may further include a rotary block having an outer surface coupled to an inner surface of the winding roll to rotate together, and having a rotary shaft coupled to the second rotary element.

The cordless blind device may further include: an encoder sensing rotation of at least any one of the winding roll and the driving motor; and a control module driving the driving module when the encoder senses rotation.

The control module may stop the driving motor when an instantaneous load increases while the driving motor operates.

The cordless blind device may further include a control module controlling the driving motor, and rotating the driving motor when an electromotive force is generated in the driving motor.

Advantageous Effects of Invention

According to the present invention, it is possible to very conveniently operate a blind device without a puling string (a cord). In particular, it is possible to very conveniently operate the blind device by selecting various operation types such as manual, semiautomatic, and automatic types, if necessary, through the complex and efficient driving structure in the blind device without a cord. Therefore, it is possible to completely remove the structural and functional problems generated by using a cord in the related art, and it is also possible to more conveniently operate and use the blind device in desired types.

DESCRIPTION OF EMBODIMENTS

Figure 1:
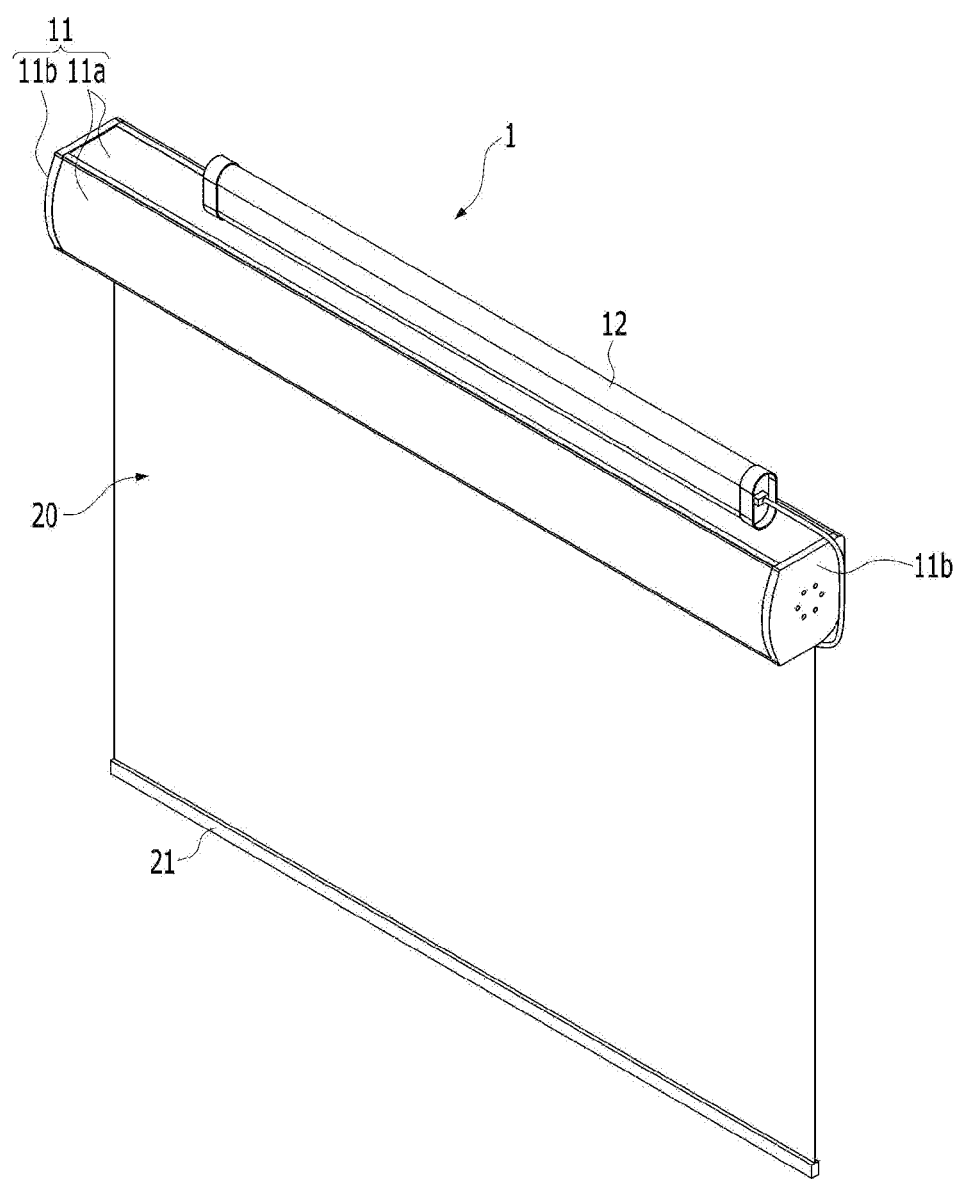
FIG. 1 is a perspective view of a cordless blind device according to an embodiment of the present invention.

The advantages and features of the present invention, and methods of achieving them will be clear by referring to the exemplary embodiments that will be described hereafter in detail with reference to the accompanying drawings. However, the present invention is not limited to the exemplary embodiments described hereafter and may be implemented in various ways, and the exemplary embodiments are provided to complete the description of the present invention and let those skilled in the art completely know the scope of the present invention. The present invention is defined by claims. Like reference numerals indicate the same components throughout the specification.

Hereafter, a cordless blind device according to an embodiment of the present invention will be described in detail with reference to FIGS. 1 to 12.

Figure 2:
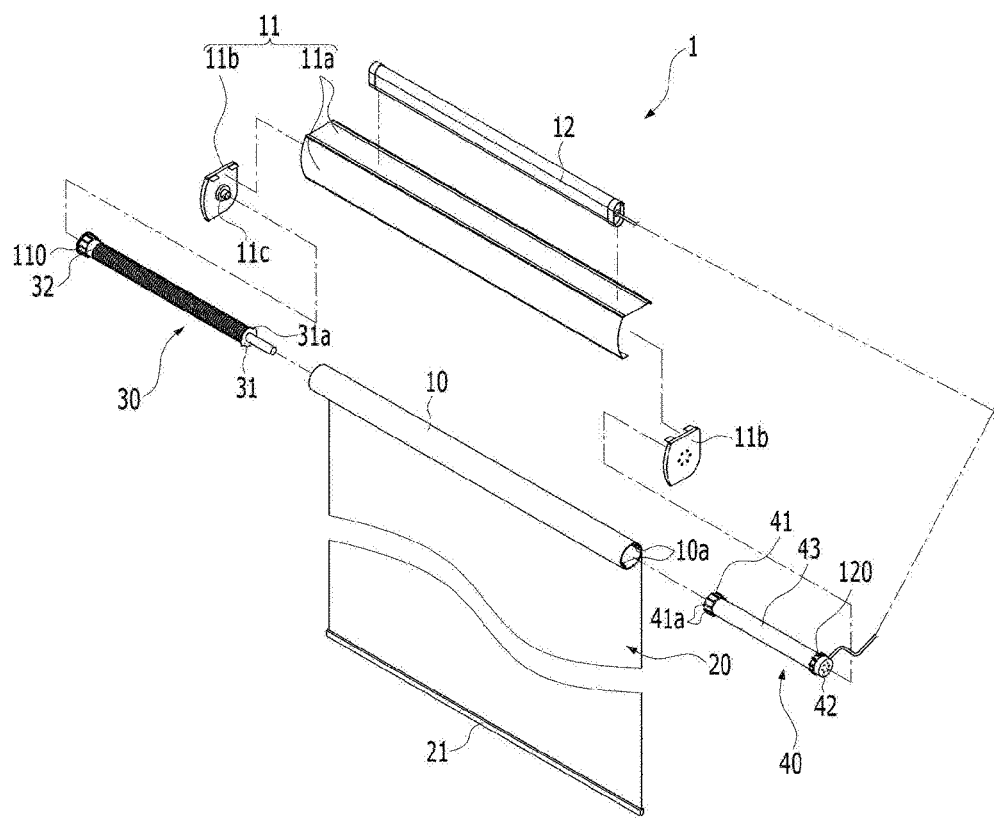
FIG. 2 is an exploded perspective view of the cordless blind device shown in FIG. 1.
Figure 3:
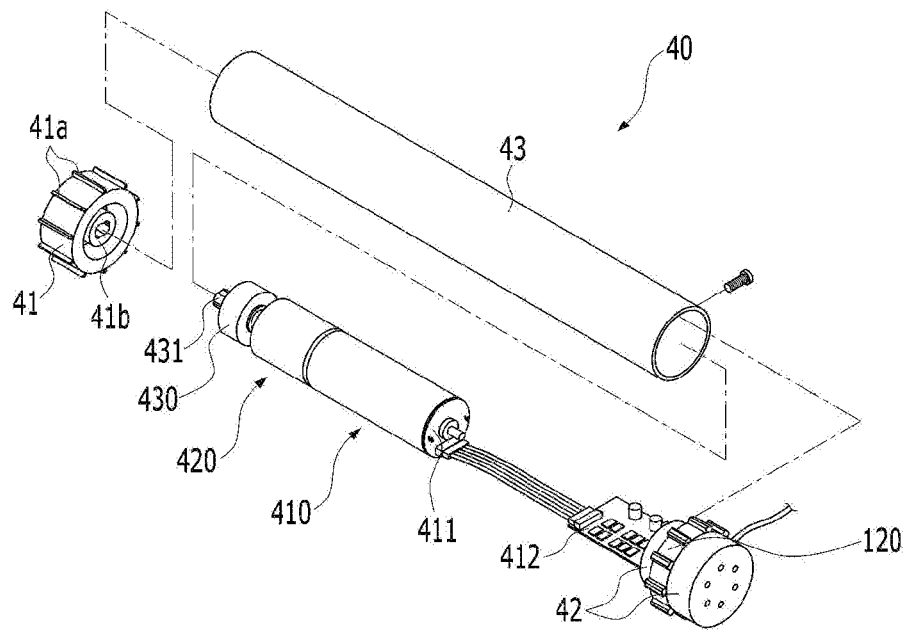
FIG. 3 is an enlarged perspective view of a rotation conversion module and a driving motor that are disposed in a winding roll shown in FIG. 2.
Figure 4:
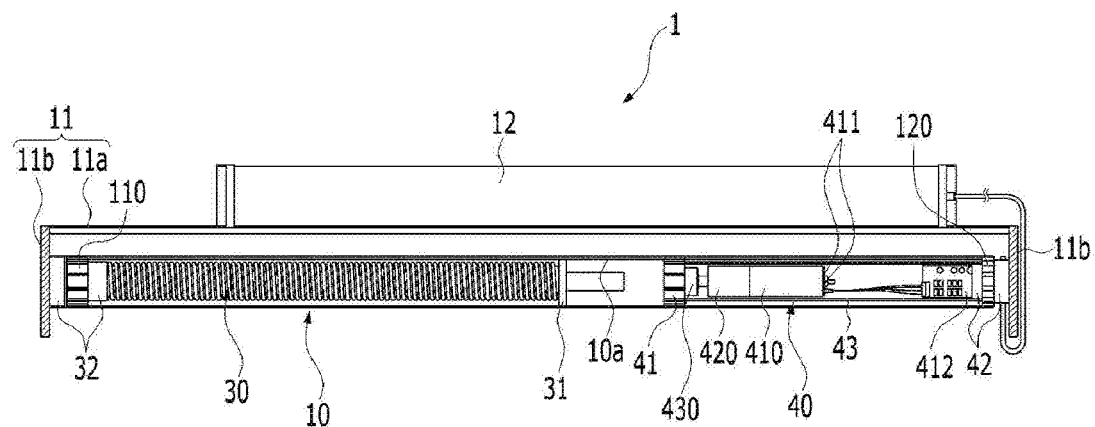
FIG. 4 is a cross-sectional view of the internal structure of the cordless blind device shown in FIG. 1.
Figure 5:
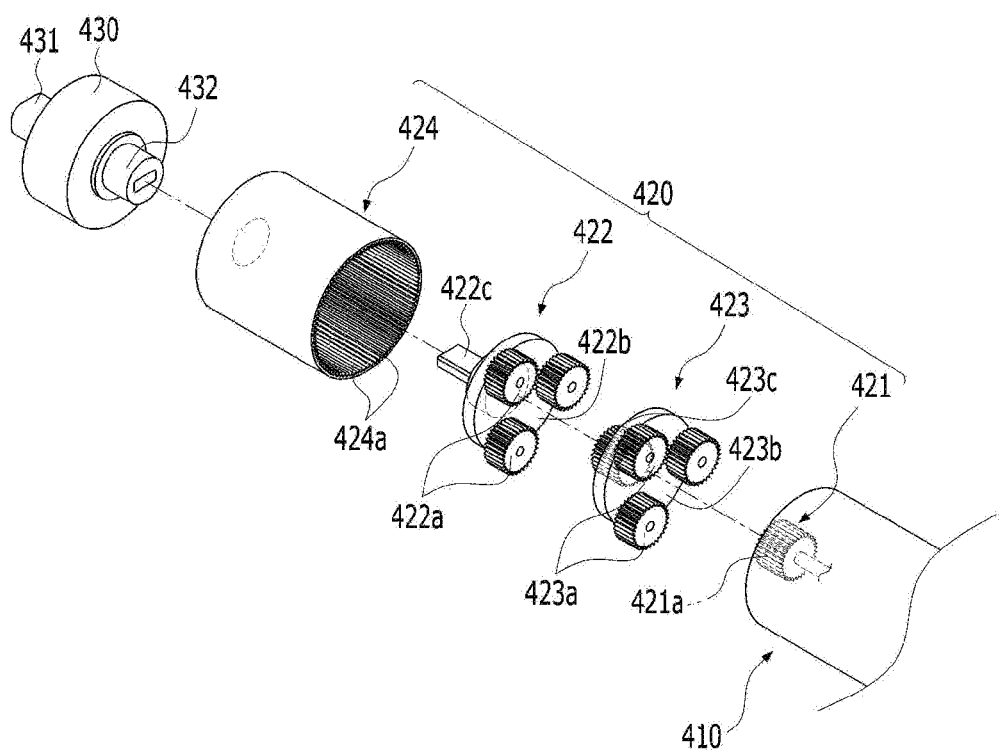
FIG. 5 is an exploded perspective view of the rotation conversion module shown in FIG. 3.
Figure 6:
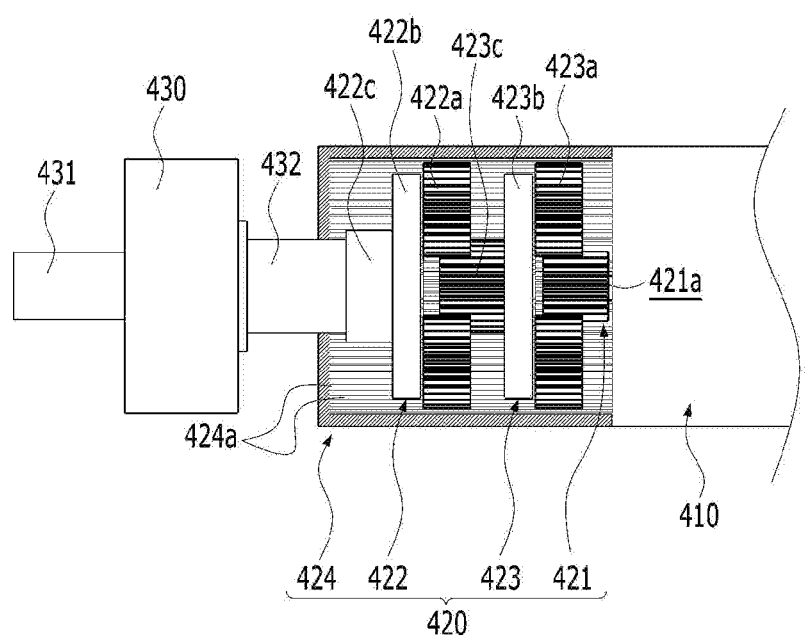
FIG. 6 is a cross-sectional view showing the internal structure of the rotation conversion module shown in FIG. 3.

FIG. 1 is a perspective view of a cordless blind device according to an embodiment of the present invention, FIG. 2 is an exploded perspective view of the cordless blind device shown in FIG. 1, FIG. 3 is an enlarged perspective view of a rotation conversion module and a driving motor that are disposed in a winding roll shown in FIG. 2, FIG. 4 is a cross-sectional view of the internal structure of the cordless blind device shown in FIG. 1, FIG. 5 is an exploded perspective view of the rotation conversion module shown in FIG. 3, and FIG. 6 is a cross-sectional view showing the internal structure of the rotation conversion module of FIG. 3. A screen and a weight are not shown in the cross-sectional view of FIG. 4 to more clearly show particularly the inside of the winding roll.

Referring to FIGS. 1 to 6, a cordless blind device 1 according to an embodiment is a blind device in which a screen 20 is wound on or unwound from a winding roll 10.

According to the cordless blind device 1 of the present invention, the screen 20 is pulled by the weight 21, so torque is applied to the winding roll 10 in the unwinding direction of the screen 20. Further, a torsion spring 30 applies torque to the winding roll 10 in the winding direction of the screen 20, and a rotation conversion module 420 and a driving motor 410 that are connected to the winding roll 10 operate as a resistance unit that resists rotation. Accordingly, in the present invention, when the driving motor 410 does not generate driving force, the torque applied by the torsion spring 30, the torque applied by the weight 21, and the resistance by the rotation conversion module 420 and the driving motor 410 make equilibrium, so the screen 20 remains stopped. When an external force is applied upward or downward to the weight 21, the equilibrium of the forces breaks, so the screen 20 is wound on or unwound from the winding roll 10.

That is, in the blind device of the present invention, torque is generated in opposite directions in a pair and applied to the winding roll 10. In particular, there is a structural characteristic in that the difference between the torque generated in the opposite direction is offset by the resistance generated between the rotation conversion module 420 and the driving motor 410, thereby more precisely making equilibrium of force. By using this structure, it is possible to naturally stop the screen 20 at any unwound position, and accordingly, it is possible to easily operate the screen 20 even without an operation tool such as a pulling string (cord). In particular, it is possible to easily wind or unwind the screen 20 even by breaking the equilibrium of force by applying a slight external force to the weight 21 using a hand, etc.

Further, when the driving motor 410 is driven, the rotation conversion module 420 and the driving motor 410 are rotated and can operate the winding roll 10, so they also function as a driving unit. That is, when a user manually or semi-automatically applies an external force directly to the weight 21 and the screen 20 is operated, the rotation conversion module 420 and the driving motor 410 function as a resistance unit, but when a constant rotation is given, the driving motor 410 automatically operates and increases torque, whereby the screen 20 can be automatically operated. That is, the rotation conversion module 420 connected to the winding roll 10 has a bidirectional rotation transmission structure that can transmit rotation from the winding roll 10 to the driving motor 410 or transmits rotation of the driving motor to the winding roll 10. Accordingly, the rotation conversion module 420 and the driving motor 410 are dependently rotated and function as a resistance unit when the winding roll 10 is rotated first by an external force, and they function as a driving unit that transmits rotation of the driving motor 410 to the winding roll 10 when the driving motor 410 is rotated. By this structural characteristic, the present invention is characterized in that it is possible to operate the screen 20 in various ways such as manually, semi-automatically, or automatically, that is, the screen 20 may be operated by applying an external force using a hand, etc., the screen 20 may be automatically operated by driving the driving motor 410, or the driving motor 410 may be completely automatically operated by a remote controller, etc.

In detail, the cordless blind device 1 of the present invention includes; a winding roll 10 coupled to a rotary shaft; a screen 20 being wound on or unwound from the winding roll 10; a driving motor (see 410 in FIGS. 3 to 6) winding or unwinding the screen 20 by providing rotational driving force to the winding roll 10; a weight 21 connected to the lower end of the screen 20 and applying torque to the winding roll 10 using gravity in a first direction in which the screen 20 is unwound; a torsion spring 30 applying torque in a second direction in which the screen 20 is wound by applying elasticity to the winding roll 10; and a rotation conversion module (see 420 in FIGS. 3 to 6) coupled between the driving motor 410 and the winding roll 10 and transmitting driving force in two directions by transmitting rotational force provided from the driving motor 410 to the winding roll 10 or transmitting torque provided from the torsion spring 30 to the winding roll 10, in which when the driving motor 410 does not generate driving force, the torque applied by the torsion spring 30, the torque applied by the weight 21, and the resistance by the rotation conversion module 420 and the driving motor 410 make equilibrium, so the screen 20 remains stopped. When an external force is applied upward or downward to the weight 21, the equilibrium of the forces breaks, so the screen 20 is wound on or unwound from the winding roll 10. Hereafter, the cordless blind device 1 is described in more detail through an embodiment of the present invention.

The winding roll 10 is coupled to a rotary shaft to be rotated. The rotary shaft, which is a structure supporting and rotating the winding roll 10, may be implemented in various forms. For example, as shown in FIG. 2, a structure including rotary rings 110 and 120 coupled to both ends of the winding roll 10 may function as the rotary shaft. The rotary rings 110 and 120 are respectively coupled to both ends of the winding roll 10, rotate about a first fixed block 32 and a second fixed block 42, and can rotatably support the winding roll 10. The rotational center of the rotary rings 110 and 120 may be aligned with the rotational center of the winding roll 10. However, the present invention is not limited to this structure, and the winding roll 10 may be coupled to another structure rotatably supporting the winding roll 10 to rotate in another embodiment. That is, in the present invention, the rotary shaft does not necessarily mean only a structure coupled as a shaft at a rotational center, and various structures that can rotatably support a rotary member such as the winding roll 10 about a rotational center are all included.

The winding roll 10 may have guide protrusions longitudinally extending therein (see 10a in FIGS. 2 to 4). The guide protrusions 10a, which are structures for coupling the winding roll 10 to the rotary rings 110 and 120 and the first and second rotary blocks 31 and 41 to be described below, may be formed as link rails protruding from the inner surface and longitudinally extending. The rotary rings 110 and 120, the first rotary block 31, the second rotary block 41, etc. has coupling structures such as protrusions or grooves, which are engaged with the guide protrusions 10a, on the outer surfaces, thereby being coupled to the winding roll 10. The rotary rings 110 and 120 coupled with the winding roll 10, as described above, form a supporting structure that can rotate with the winding roll 10 about the first fixed block 32 and the second fixed block 42. The first rotary block 31 generates a rotational displacement in the torsion spring 30 or transits elasticity of the torsion spring 30 to the winding roll 10 while rotating with the winding roll 10, and the second rotary block 41 transmits rotation of the winding roll 10 to the rotation conversion module 420 or transmits rotation from the rotation conversion module 420 back to the winding roll 10 while rotating with the winding roll 10. That is, the winding roll 10 may be formed to accommodate the torsion spring 30, the rotation conversion module 420, etc. therein and to be able to transmit or receive a rotational force by being combined with them. The structure in which the winding roll 10, the torsion spring 30, the rotation conversion module 420, etc. are combined is also not limited to this structure and can be modified in various types in which they can be combined and can transmit rotation to each other while rotating.

A frame 11 can accommodate the winding roll 10 therein and can support the winding roll 10. The frame 11 may be combined with the winding roll 10, for example, through a structure such as a connector (see 11c in FIG. 2). The connector 11c is formed in a shaft shape and can determine the rotational center of the winding roll 10. That is, all of the rotary rings 110 and 120, the first fixed block 32 and the second fixed block 42 coupled to the rotary rings 110 and 120 and fixed to both ends of the winding roll 10, and the connector 11c connecting the first fixed block 32 and the second fixed block 42 to the frame 11 can function as a rotary shaft rotatably supporting the winding roll 10. As described above, this rotational supporting structure may be appropriately changed, if necessary. The frame 11 may be composed of vertical frames 11b and horizontal frames 11a, as shown in FIGS. 1 and 2. The vertical frames 11b and the horizontal frames 11a are detachably coupled and can accommodate the winding roll 10 therein. The frame 11 may have a fixing member such as a bracket at a side to be easily installed on an outer wall such as around a window. The horizontal frames 11a may be disposed to face both ends of the winding roll 10, and the vertical frames 11b may connect them. The structure or shape of the frame 11 may be changed in other various shapes.

A battery box 12 for supplying power to the driving motor 410, etc. may be formed at a side of the frame 11. The battery box 12 is connected to the driving motor or a controller through power cables, etc., thereby being able to supply power. As shown in the figures, it is possible to install a large-capacity battery by applying a relatively large battery box 12. The battery box 12 may be detachably formed and can maintain the standby time for which the cordless blind device 1 can be automatically operated, at the level of years by having a large-capacity battery. The shape or structure of the battery box 12 is also not limited to that shown in the figures and may be appropriately changed in other structures, if necessary. If necessary, it is possible to receive power through an electrical outlet, etc., and wirelessly receive power without the battery box 12.

The screen 20 is wound on or unwound from the winding roll 10, whereby the length changes. The screen is fixed to the outer surface of the winding roll 10 at the upper end and is connected to the weight 21 at the lower end to maintain tension. When the winding roll 10 is rotated in a direction, the screen 20 is rolled (wound) on the winding roll 10, so the length of the unwound portion decreases. When the winding roll 10 is rotated in the opposite direction, the screen 20 is unrolled (unwound) from the winding roll 10, so the length of the unwound portion increases. That is, the screen 20 can move up and down by rotation of the winding roll 10. The screen may be made of fabric and may be made of various materials that can block light. The length, width, etc. of the screen 20 may be appropriately adjusted in accordance with the size of the window to which the cordless blind device 1 is applied, or the size of the installation space.

The weight 21 may be made of a relatively heavy material or a heavy material may be included in at least a portion of the weight 21. It is possible to change the weight of the weight 21 by detaching the entire weight 21 or a weight member. The weight 21, as shown in the figure, is connected to the lower end of the screen 20, thereby applying tension to the screen 20 using its own weight. Accordingly, torque that rotates the winding roll 10 connected to the upper end of the screen 20 can be applied. That is, the weight 21 is connected to the lower end of the screen 20, thereby applying torque to the winding roll 100 in the first direction in which the screen 20 is unwound by gravity. The shape of the weight 21 is not limited to the shape shown in the figures and may be changed in various shapes.

The torsion spring 30 applies torque in the opposite direction to the first direction by applying elasticity to the winding roll 10. The torsion spring 30, as described above, can be coupled to the winding roll 10 through the first rotary block 31, thereby being able to apply elasticity to the winding roll 10. That is, the torsion spring 30 applies torque in the second direction in which the screen 20 is wound by applying elasticity to the winding roll 10. The torsion spring 30, as shown in FIGS. 2 and 4, may be accommodated in the winding roll 10 and can contract and stretch while rotating with the winding roll 10. The torsion spring 30 may be a torsional elastic body that keeps elastic energy by elastically deforming with rotation of the winding roll 10, and the torsional elastic body may be a coil spring. The torsion spring 30, as shown in FIG. 2, may have both ends connected to the first rotary block 31 and the first fixed block 32, respectively. As described above, the first rotary block 31 is coupled to the winding roll 10 to rotate together, is coupled to the frame 11 of the first fixed block 11 to be fixed, and may cause torsion of the torsion spring 30. The torsion spring 30, as shown in the figures, may be inserted in parallel in the winding roll 10.

The first rotary block 31 is connected to an end of the torsion spring 30 and is coupled to the winding roll 10 to rotate. Coupling grooves (see 31*a* in FIG. 2) for coupling to the guide protrusions 10*a* may be formed at the first rotary block 31. The first fixed block 32 is formed at the other end of the torsion spring 30, so it is fixed to the frame 11. The rotary ring 110 is rotatably coupled to the circumference of the first fixed block 32 and is coupled to the winding roll 10, thereby rotatably supporting the winding roll 10. Accordingly, when the winding roll 10 is rotated, an end of the torsion spring 30 connected to the first rotary block 31 is twisted and the other end is kept fixed, whereby a rotational displacement is generated. Accordingly, torque can be generated from the torsion spring 30. The generated torque is the torque applied in the second direction in which the winding roll 10 is wound as described above. The more the winding roll 10 is rotated, the larger the torsion and the larger the rotational displacement, so the torque applied by the torsion spring 30 also increases.

That is, the longer the screen 20 unwinds, the higher the number of rotations of the winding roll 10, and the higher the number of rotations, the larger the magnitude of the torque applied in the opposite direction (winding direction) by the torsion spring 30. Further, as the length of the unwound screen 20 increases, the weight applied to the winding roll 10 in the gravity direction (unwinding direction) proportionally increases, whereby the torque applied to the winding roll 10 through the weight 21 in the unwinding direction and the torque applied to the winding roll 10 by the torsion spring 30 in the winding direction increase or decrease in a pair in accordance with the length of the screen 20. Using this structure, the cordless blind device 1 can fundamentally appropriately fix the screen 20 even though the screen 20 is at any position. Though not shown, a shaft structure connecting the first rotary block 31 and the first fixed block 32 through the torsion spring 30 may be formed, and the first rotary block 31 may be rotatably coupled to the shaft structure.

The pair of torque may not be precisely in equilibrium. According to the present invention, as described above, resistance is generated against rotation of the winding roll 10 by connecting the rotation conversion module 420 and the driving motor 410 to the winding roll 10, and equilibrium of force is maintained to stop the screen member 20 by the resistance. That is, when the driving motor 410 does not generate a driving force, torque applied by the torsion spring 30, torque applied by the weight 21, and the resistance by the rotation conversion module 420 and the driving motor 410 make equilibrium, whereby the screen 20 is maintained in a stop state. As described above, since equilibrium of force is made by the resistance of the rotation conversion module 420 and the driving motor 410, it is possible to very effectively stop the screen 20 at any position. Further, as described above, by applying the resistance of the rotation conversion module 420 and the driving motor 410 to the design as an element making equilibrium of force, there may be an advantage that a rotational resistance member is directly used as a driving device that automatically operates the screen 20 by driving the driving motor 410 without a separate driving unit other than the resistance member. The torque applied by the torsion spring 30 is set larger than the resultant force of friction resistance of the rotation conversion module 420 and regenerative resistance of the driving motor 410 (which means electromagnetic resistance by an induced current or an electromotive force generated by rotation of a motor), so when equilibrium breaks due to an external force and rotation starts, rotation is possible at least over the resistance. However, the resistance is set to have magnitude that can offset the difference of the pair of opposite torque, that is, the torque applied in the winding direction by the torsion spring 30 and the torque applied in the unwinding direction by the weight 21 in the opposite direction so that equilibrium is immediately made when an external force is removed.

Hereafter, the structures and operations of the rotation conversion module 420 and the driving motor 410 are described in more detail.

The rotation conversion module 420 and the driving motor 421, as shown in FIGS. 3 and 4, are combined in a compact size by a housing 43 and may be disposed in the winding roll 10. The rotation conversion module 420, the driving motor 410, the second rotary block 41 connecting the rotation conversion module 420 and the winding roll 10, and the second fixed block 42 connected to the housing 43 and fixing the driving motor 410 to prevent rotation thereof and coupling the driving motor 410 to the frame 11 may form a rotation conversion unit 40. That is, it is possible to form a coupling structure in which the second rotary block 41 is disposed at an end of the rotation conversion unit 40, the second fixed block 42 is disposed at the other end, and the rotary ring 120 is disposed around the second fixed block 42, that is the same as the structure in which the first rotary block 31 is disposed at an end of the torsion spring 30, the first fixed block 32 is disposed at the other end, and the rotary ring 110 is disposed around the first block 32. By this structure, it is possible to receive rotation of the winding roll 10 or transmit rotation to the winding roll 10 by coupling with the winding roll 10. As shown in FIG. 3, an entrance for a cable for supplying power to the driving motor 410, etc. may be formed at the second fixed block 42, and the driving motor 410 may be connected to the rotation conversion module 420 at the front end where a rotary shaft is disposed, and may be coupled to an encoder 411 at the rear end. The encoder 411 may be connected to a control module 412 fixed in the second fixed block 42 to be supplied with power and transmit/receive signals. The encoder 411, for example, may convert rotation of a magnet coupled to the shaft of the driving motor 410 into an electrical signal and receive the electrical signal. It is possible to semi-automatically or automatically operate the blind device by operating the driving motor at an appropriate point in time, as described above, using the encoder 411 and the control module 412. This control method will be described in more detail below.

As shown in FIGS. 5 and 6, the rotation conversion module 420 includes a first rotary element 421 connected to the driving motor 410 to rotate together, a second rotary module 422 connected to the winding roll 10 to rotate, and an intermediate rotary unit 423 disposed between the first rotary element 421 and the second rotary element 422 to transmit power. As shown in the figures, the first rotary element 421 and the second rotary module 422 are coaxially arranged, and the intermediate rotary unit 423 connects the first rotary element 421 and the second rotary module 422. In particular, the intermediate rotary unit 423 reduces and transmits the rotational speed of the first rotary element 421 to the second rotary element 422. The rotation conversion module 420, as shown in the figures, may be composed of a plurality of gears. However, the rotation conversion module 420 may not necessarily include gears, and the intermediate rotary unit 423 may be formed using various rotary elements connected to the winding roll 10 to rotate together and connected to the driving motor 410 to rotate together and various intermediate structures disposed between the rotary elements to be able to transmit power. It is exemplified in the embodiment that the intermediate rotary unit 423 includes gears.

As shown in FIGS. 5 and 6, the first rotary element 421 may include a first sun gear 421a; the intermediate rotary unit 423 may include a plurality of first planetary gears 423a revolving around the first sun gear 421a, a first rotary plate 423b to which the rotary shafts of the first planetary gears 423a are coupled, and a second sun gear 423c coupled to the side opposite to the side to which the first planetary gears 423a are coupled of the first planetary plate 423b; and the second rotary element 422 may include a plurality of second planetary gears 422a revolving around the second sun gear 423c and a second rotary plate 422b to which the rotary shafts of the second planetary gears 422a are coupled. The first sun gear 421a is coupled to the shaft of the driving motor 410, and both of the first planetary gears 423a of the intermediate rotary unit 423 and the second planetary gears 422a of the second rotary element 422 may be inscribed to a ring gear 424a formed on the inner surface of a ring gear unit 424. For example, a connection shaft 422c protruding from the side opposite to the side, to which the second planetary gears 422a are coupled, of the second rotary plate 422b. Further, the connection shaft 422c may be coupled to the second rotary block (see 41 in FIGS. 3 and 4) described above through a shaft member 430. The shaft member 430 can function as a rotary shaft of the second rotary block 41. The shaft member 430 may be fixed by being coupled to the shaft coupling portion (see 41b in FIG. 3) of the second rotary block 41. That is, as described above, since a rotary block (i.e., the second rotary block 41) of which the outer surface is coupled to the inner surface of the winding roll (see 10 in FIG. 4) to rotate together and of which the rotary shaft is coupled to the second rotary element 422 is included, rotation can be transmitted in two directions between the rotation conversion module 420 and the winding roll 10.

The second rotary element 422 and the intermediate rotary unit 423, as shown in the figures, each include planetary gears changing a rotational ratio while revolving around the sun gear. The first sun gear 421a of the first rotary element 421 is coupled to the shaft of the driving motor 410 and the second rotary plate 422b of the second rotary element 422 is coupled to the shaft member 430 through the connection shaft 422c, thereby rotating in synchronization with the second rotary block 41. The second rotary block 41 is coupled to the winding roll 10 through the coupling protrusions (see 41a in FIG. 3) on the outer surface and rotated with the winding roll 10, as described above, so rotation of the winding roll 10 is transmitted to the second rotary element 422 and is transmitted to the driving motor 410 coupled with the first rotary element 421 through the intermediate rotary unit 423. When the first rotary element 421 coupled to the driving motor 410 rotates, the rotation is transmitted in the opposite direction through the intermediate rotary unit 423, so the rotation is transmitted to the winding roll 10 connected to the second rotary element 422. As described above, rotation is transmitted in two directions between the winding roll 10 and the driving motor 410 through the intermediate rotary unit 423. Since the second rotary element 422, the intermediate rotary unit 423, and the first rotary element 421 are coaxially arranged by engagement of the sun gears and the planetary gears, bidirectional rotation can be very smoothly and effectively transmitted. Since the second planetary gears 422a and the first planetary gears 423a of the second rotary element 422 and the intermediate rotary unit 423 are doubly engaged through the second sun gear 423c, it is possible to change the rotational ratio at least one time and decrease/increase and transmit the rotational speed using the revolving structure of the planetary gears. Accordingly, the rotational ratio between the driving motor 410 and the winding roll 10 can be very appropriately adjusted. The rotational ratio between the driving motor 410 and the winding roll 10 is, for example, set as 12:1, etc., whereby the rotational speed of the driving motor 410 can be decreased and transmitted to the winding roll 10.

Hereafter, the detailed operation process of the rotation conversion module, the method of controlling the cordless blind device through the control module, the encoder, etc., and the operation process of the entire cordless blind device operated by the control method are described in more detail with reference to FIGS. 7 to 12.

Figure 7A:
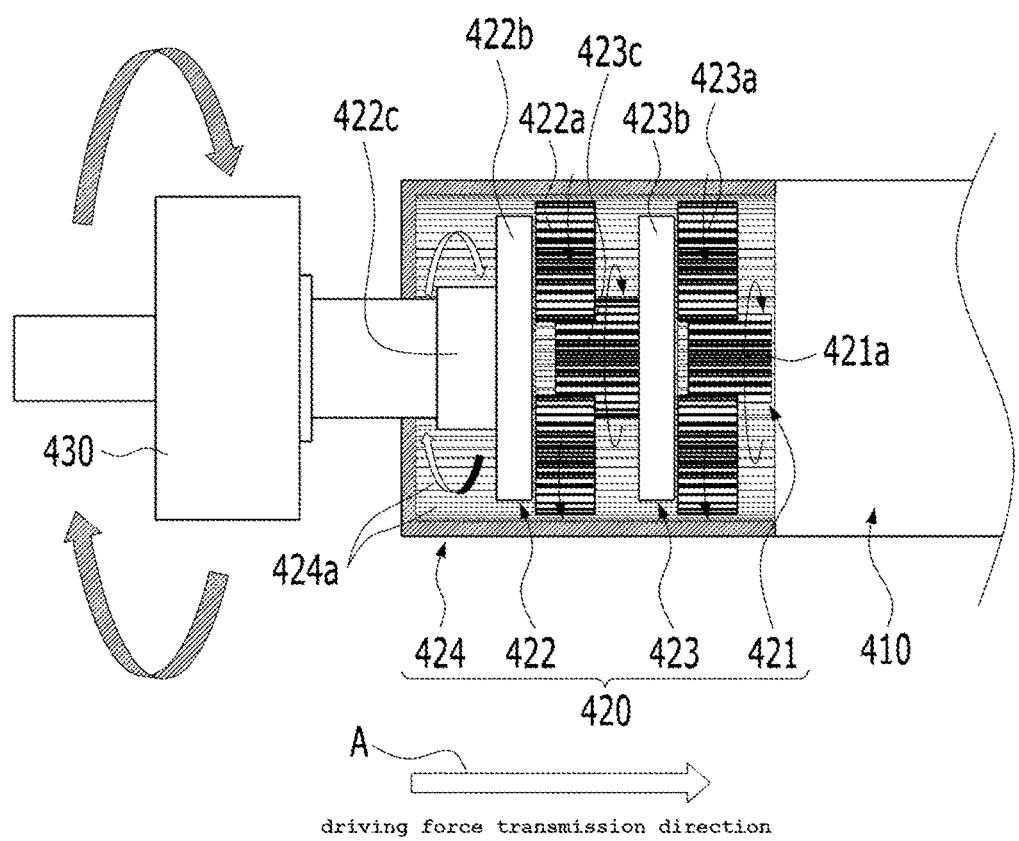
FIGS. 7A-7B are views exemplifying the operation process of the rotation conversion module shown in FIG. 3.
Figure 7B:
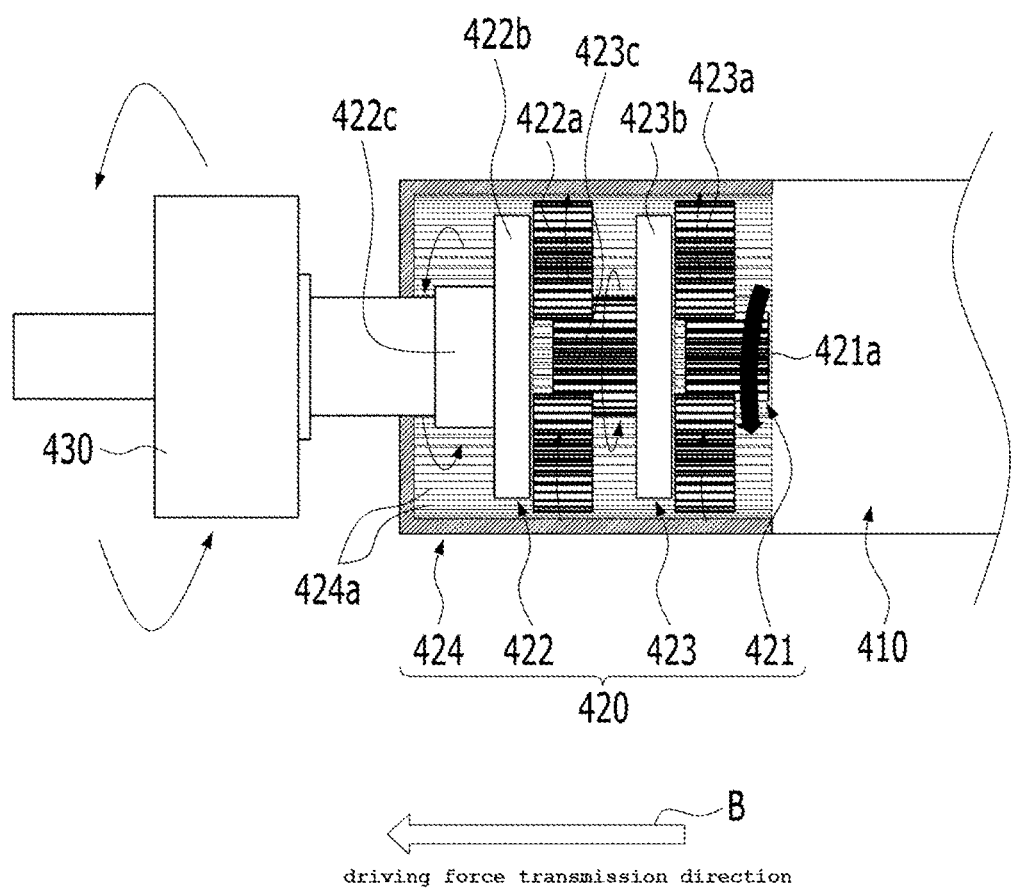
Figure 8A:
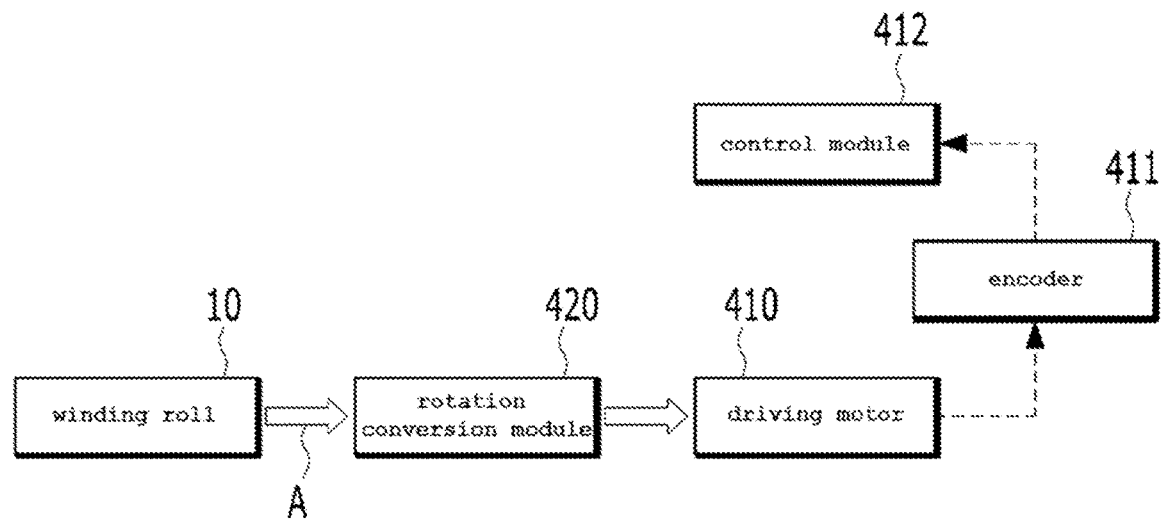
FIGS. 8A-8B are schematic views exemplifying a control method of the cordless blind device shown in FIG. 1.
Figure 8B:
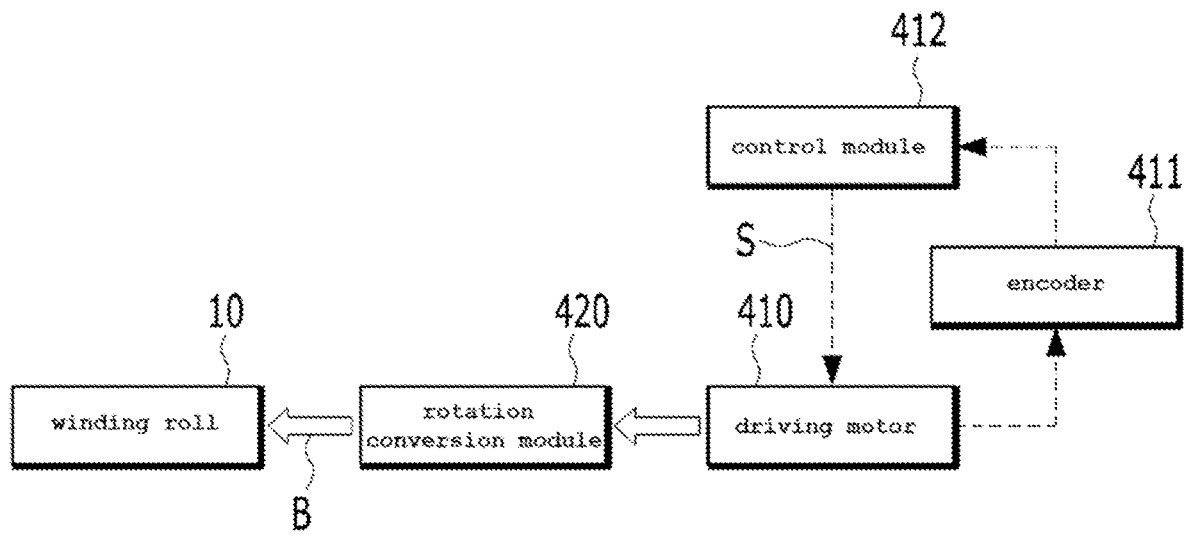

FIGS. 7A-7B are views exemplifying the operation process of the rotation conversion module shown in FIG. 3, FIGS. 8A-8B are schematic views exemplifying a control method of the cordless blind device shown in FIG. 1, and FIGS. 9A-9B to 12A-12B are views exemplifying the operation process of the cordless blind device shown in FIG. 1.

Referring to FIGS. 7A-7B, the rotation conversion module 420 can very effectively transmit bidirectional rotation through the combination of the sun gears and the planetary gears. For example, as shown in FIG. 7A, a driving force may be transmitted from the shaft member 430 to the rotation conversion module 420 (in a direction A). The shaft member 430, as shown in FIGS. 3 and 5, is coupled to the second rotary block 41 through the first fixed portion 431 and coupled to the connection shaft 422c of the second rotary element 422 through the second fixed portion 432, so it functions as the rotary shaft of the second rotary block 41, thereby being able to transmit a rotational force of the second rotary block 41 rotating with the winding roll 10 to the rotation conversion module 420. As described above, when rotation is transmitted to the rotation conversion module 420, the second rotary plate 422b of the second rotary element 422 rotates in the same direction and revolves the second planetary gears 422a. Since the second planetary gears 422a move in mesh with the ring gear 424a formed on the inner surface of the ring gear unit 424, the rotational direction reverses to be opposite to the revolving direction of the second rotary plate 422b. Accordingly, the second sun gear 423c engaged with the second planetary gears 422a rotates in the opposite direction to the rotational direction of the second planetary gears 422a. Since the second sun gear 423c is integrated with the first rotary plate 423b, the first rotary plate 423b revolves the first planetary gears 423a while rotating in the same direction as the rotational direction of the second sun gear 423c. Further, the second planetary gears 422a move in mesh with the ring gear 424a, the rotational direction reverses to be opposite to the revolving direction of the first rotary plate 423b. As a result, the first sun gear 421a engaged with the first planetary gears 423a transmits rotation to the driving motor 410 while rotating in the opposite direction to the rotational direction of the first planetary gears 423a.

As described above, a rotational driving force can be effectively transmitted from the winding roll 10 to the driving motor 410 (in the direction A) through the second rotary element 422, the intermediate rotary unit 423, and the first rotary element 421. The rotational ratio is changed at least one time by the gear ratios of the planetary gears, the gear ratios of the sun gears, and the gear ratio of the ring gear. Accordingly, a rotational speed can be changed and transmitted, and for example, it is possible to increase the rotational speed of the driving motor 410 at a rotational ratio larger than the number of revolutions of the shaft member 430.

On the other hand, as shown in FIG. 7B, a driving force may be transmitted from the driving motor 410 to the rotation conversion module 420 (in a direction B). A driving force can be more effectively transmitted in the opposite direction in the reverse process of the rotation process described above. When the driving motor 410 rotates, the first sun gear 421 rotates in the same direction, the first planetary gears 423a engaged with the first sun gear 421a rotate in the opposite direction and revolves on the ring gear 424a in the opposite direction to the rotational direction. Accordingly, the first rotary plate 423b engaged with the first planetary gears 423a also rotates the second sun gear 423c while rotating in the same direction as the revolving direction of the first planetary gears 423a. Since the second sun gear 423c is engaged with the second planetary gears 422a, the second planetary gears 422a rotate the ring gear 424a in the opposite direction to the rotational direction while rotating in the opposite direction to the rotational direction of the second sun gear 423c. Accordingly, the second rotary plate 422b engaged with the second planetary gears 422a also rotates the shaft member 430 connected to the second rotary plate 422b while rotating in the same direction as the revolving direction of the second planetary gears 422a. As a result, rotation in the same direction as the second rotary plate 422b is transmitted to the second rotary block 42 and the winding roll 10 through the shaft member 430 in FIGS. 3 and 4. As described above, a rotational driving force can be effectively transmitted from the driving motor 410 to the winding roll 10 (in the direction B) through the first rotary element 421, the intermediate rotary unit 423, and the second rotary element 422. In this process, the rotational ratio can be changed at least one time by the gear ratios of the planetary gears, the gear ratios of the sun gears, and the gear ratio of the ring gear, and the rotational speed can be changed and transmitted, and for example, the winding roll 10 can be rotated at a rotational speed reduced to the rotational ratio smaller than the number of revolutions of the driving motor 410.

As described above, bidirectional rotation transmission by the rotation conversion module 420 (i.e., transmission of a rotational driving force in the directions A and B described above) can be freely changed from the winding roll 10 to the driving motor 410 or from the driving motor 410 to the winding roll 10. Rotation direction transmitted when the driving force is transmitted can be freely and effectively transmitted in any direction or in the direction A or B regardless of the unwinding-directional rotation or winding-directional rotation of the winding roll 10. As described above, it is possible to very conveniently control the cordless blind device to automatically operate at appropriate points in time, as described above, using the rotation transmission operation by the rotation conversion module 420.

Referring to FIG. 8A, a rotational force can be transmitted from the winding roll 10 to the driving motor 410 through the rotation conversion module 420. In this case, as described above, a user can remove the equilibrium of force and rotate the winding roll 10 by applying an external force through the weight (see 21 in FIG. 1), etc. The rotational direction may be any one of the winding direction and the unwinding direction of the winding roll 10, and this rotation can be transmitted from the winding roll 10 to the driving motor 410 (in the direction A) using the driving force transmission structure of the rotation conversion module 420 described above. As described above, when a rotational force is transmitted to the driving motor 410, the rotation of the driving motor 410 can be sensed by the encoder 411. The encoder 411 can transmit a sensing signal of the rotation to the control module 412 and the control module 412 can recognize the rotation through the sensing signal from the encoder 411. As described above, when recognizing the rotation, the control module 412 drives the driving motor 410 by transmitting a control signal S to the driving motor 410, as shown in FIG. 8B.

Accordingly, the driving motor 410 changes from a passive rotary member that is dependently rotated by the driving force from the winding roll 10 into an active rotary member that automatically rotates. The transmission direction of the driving force is changed to a direction going from the driving motor 410 to the winding roll 10 through the transmission structure of the rotation conversion module 420 described above (the direction B), and the rotation direction by the driving force becomes the same as the initial rotational direction of the winding roll 10. Accordingly, the winding roll 10 winds or unwinds the screen (see 20 in FIG. 1) while rotating in the initial rotational direction by the driving force of the driving motor 410. It is possible to control the cordless blind device to automatically operate at appropriate points in time in this way.

That is, it is possible to automatically control the cordless blind device using the encoder 411 that senses rotation of at least any one of the winding roll 10 and the driving motor 410, and the control module 412 that drives the driving motor 410 when sensing rotation from the encoder 411. Although it was described in an embodiment of the present invention that the encoder 411 is connected to the driving motor 410 and senses rotation of the driving motor 410, it may be possible to install an encoder that directly senses rotation of the winding roll 10, sense rotation of the winding roll 10 through the encoder, and drive the driving motor 410. Further, since the winding roll 10 and the driving motor 410 are connected to each other to rotate together even though the rotational ratios are different, it may also possible to sense rotation of any one of the winding roll 10, the driving motor 410, or a rotary body (the rotation conversion module 420, the second rotary block 41, the first rotary block 31, the shaft member 430, etc.) connecting or rotating with the winding roll 10 and the driving motor 410 through the encoder, and to automatically operate the blind device by driving the driving motor 410 when sensing an appropriate number of revolutions. In this case, the control module 412 can stop the driving motor when an instantaneous load increases while the driving motor 410 operates. That is, since the load on the driving motor 410 may increase when the screen 20 stops rotating by being completely unwound or completely wound, it is possible to control the driving motor 410 to stop when the load on the driving motor 410 increases. Further, when an electromotive force is generated inside due to rotation of the driving motor 410, it is possible to drive the driving motor 410 on the basis of the electromotive force without using the encoder 411, etc. For example, it is also possible to sense the rotational speed of the driving motor 410 and then operate the driving motor or sense overload and stop driving motor in sensor-less control method.

Figure 9A:
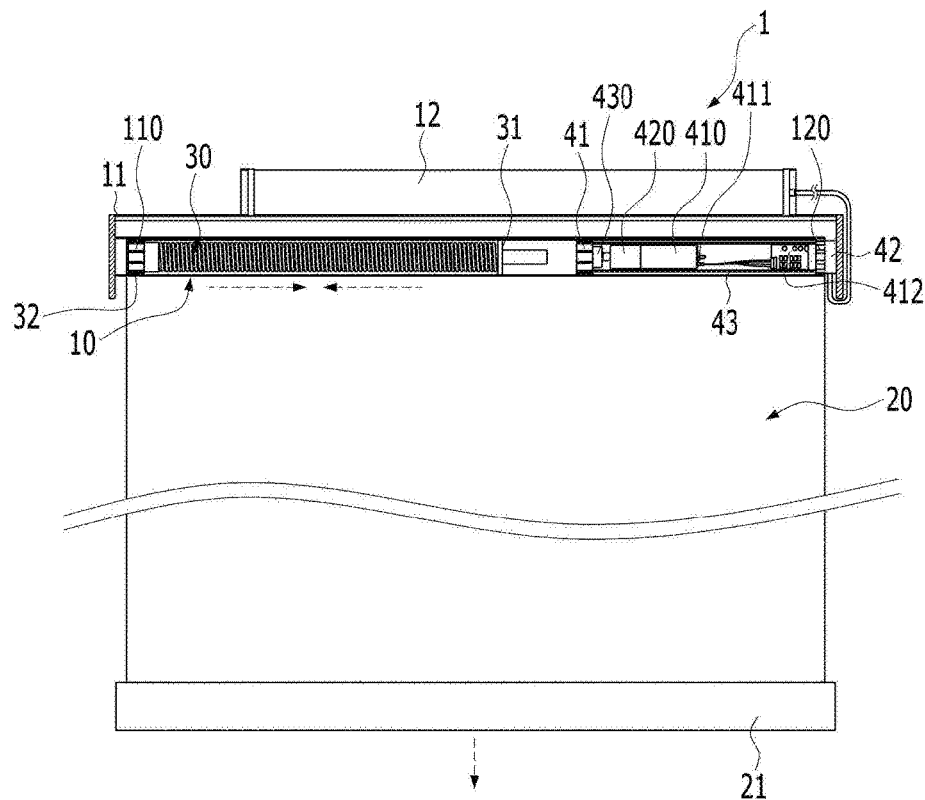
FIGS. 9A-9B, FIGS. 10A-10B, FIGS. 11A-11B and FIGS. 12A-12B are views exemplifying the operation process of the cordless blind device shown in FIG. 1.
Figure 9B:
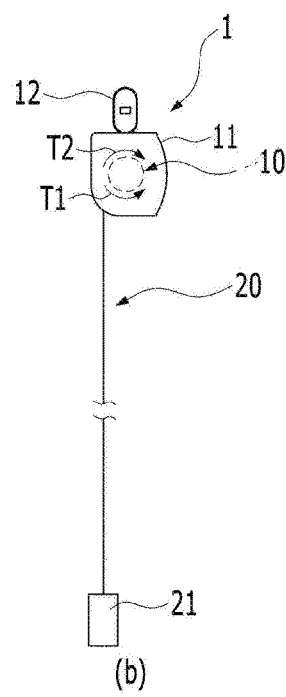

Accordingly, it is possible to very conveniently operate the cordless blind device 1 in the way exemplified in FIGS. 9A-9B to 12A-12B. According to the cordless blind device 1, as shown in FIGS. 9A-9B, when there is no external force, torque T1 applied by the weight 21 in the first direction in which the screen 20 is unwound and torque T2 applied by the torsion spring 30 in the second direction in which the screen 20 is wound are generated in a pair and somewhat make equilibrium. However, as described above, the pair of torque proportionally increases but the magnitudes may not be completely the same, so it is possible to maintain the entire equilibrium of force by offsetting the difference using the resistance of the rotation conversion module 420 and the driving motor 410 connected to the winding roll 10. That is, as described above, the resistance of the rotation conversion module 420 and the driving motor 410 is applied to the design as an element making equilibrium of force, whereby the pair of opposite torque and the resistance make equilibrium, and accordingly, the screen 20 can be maintained at a stop state.

Figure 10A:
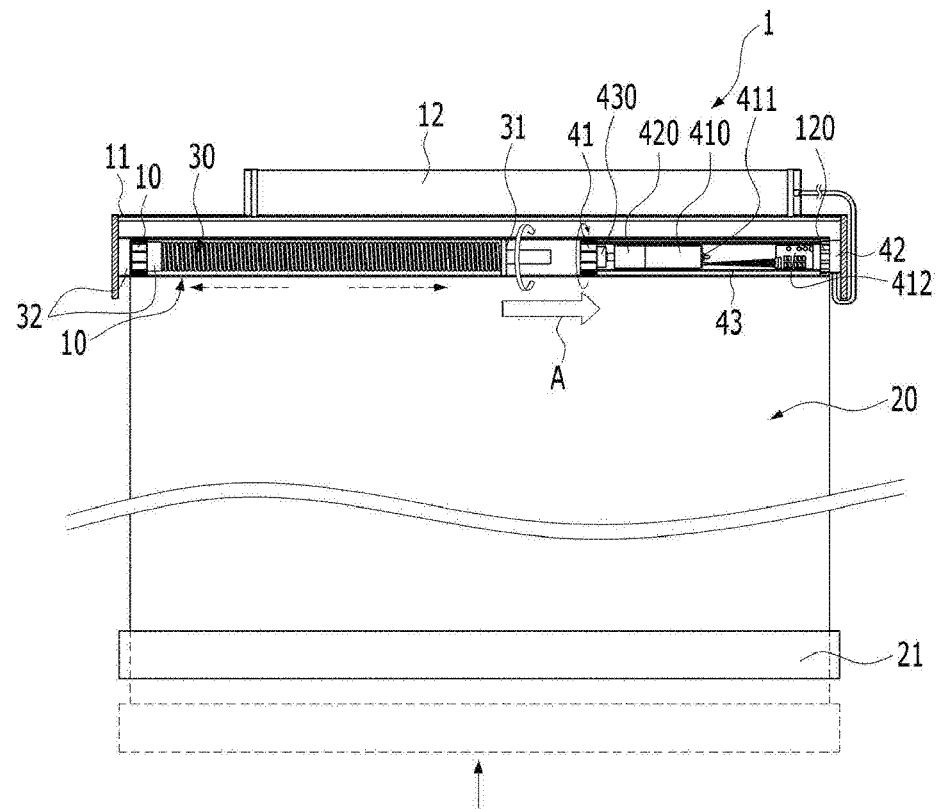
Figure 10B:
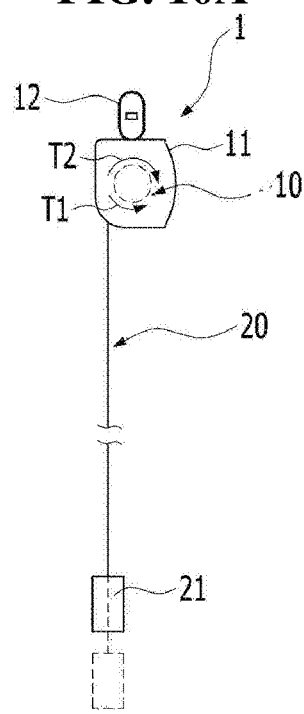

In this state, it is possible to rotate the winding roll 10 by applying an external force to the weight 21, etc., as shown in FIGS. 10A-10B. It is possible to remove the equilibrium of force even with a slight external force, and accordingly, torque in one direction is temporarily increased, thereby being able to rotate the winding roll 10 in the direction of the torque. For example, as shown in the figures, it is possible to simply rotate the winding roll 10 in the winding direction of the screen 20 by moving up the weight 21. As described above, the torque applied by the torsion spring 30 is set larger than the resultant force of friction resistance of the rotation conversion module 420 (which may be mechanical friction resistance including rotational contact of the gears) and regenerative resistance of the driving motor 410 (which means electromagnetic resistance due to an induced current generated by rotation of a motor), so when equilibrium breaks due to an external force and rotation starts, rotation is possible at least over the resistances. However, the resistance is set to have magnitude that can offset the difference of the pair of opposite torque, that is, the torque applied in the winding direction by the torsion sprint 30 and the torque applied in the unwinding direction by the weight 21 in the opposite direction, equilibrium is immediately made when an external force is removed. Accordingly, even a slight external force may need to be continuously applied to completely wind the screen 20.

Figure 11A:
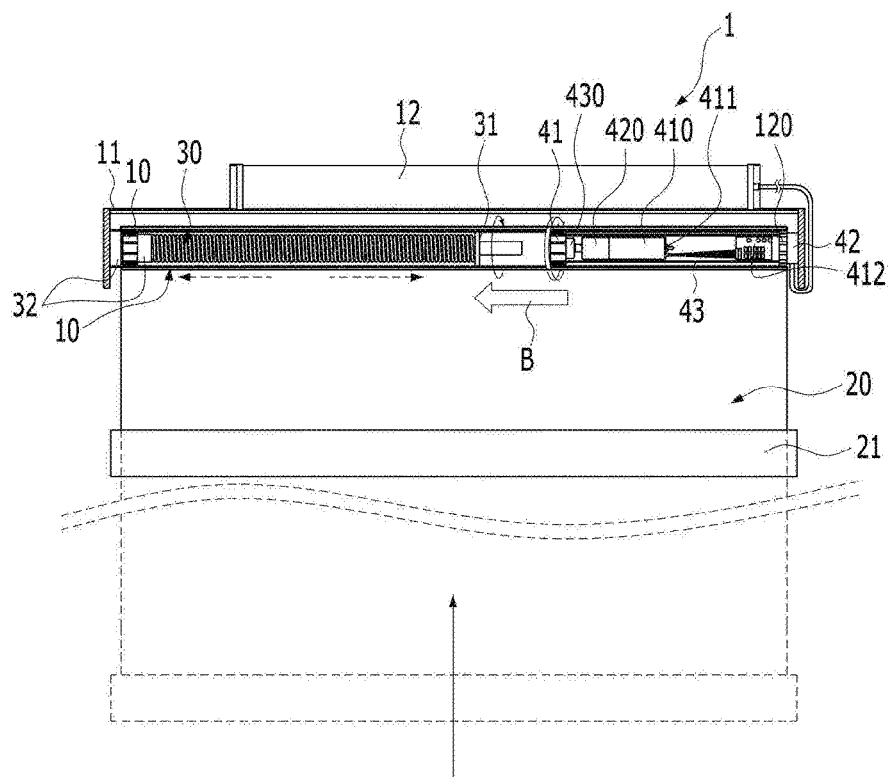
Figure 11B:
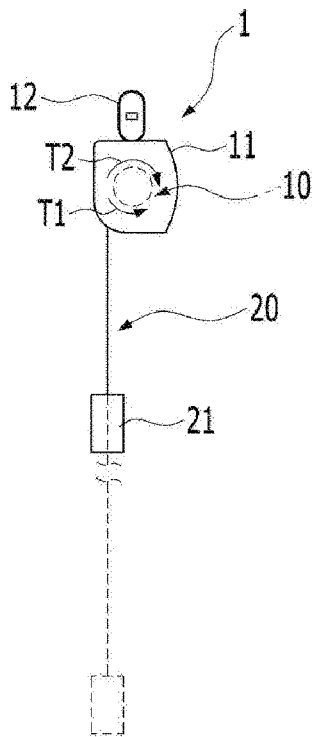
Figure 12A:
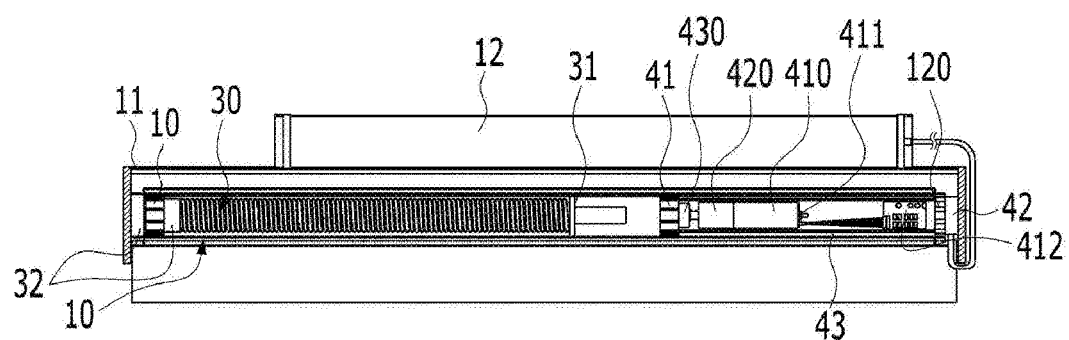
Figure 12B:
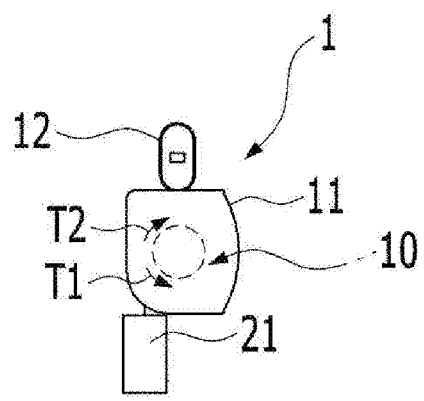

This problem is very effectively solved through the automatic control described above. That is, as shown in FIGS. 10A-10B, when the winding roll 10 rotates, a driving force is transmitted to the driving motor 410 (in the direction A) from the rotation conversion module 420, and the rotation can be sensed through the encoder 411. Accordingly, when the rotation is sensed, the control module 412 drives the driving motor 410, as described above, and the transmission direction of the driving force can be reversed to a direction going from the driving motor 410 to the winding roll 10 (the direction B). In this case, since the rotational direction is maintained as the initial rotational direction of the winding roll 1, as described above, it is possible to automatically operate the screen 20 of the cordless blind device 1 while rotating the winding roll 10 in the initially intended direction using the driving force of the driving motor 410. That is, as shown in FIGS. 10A-10B, when a user operates the winding roll 10 by applying a slight external force, a driving force is transmitted to the driving motor 410 and the control module 412 sensing it operates the driving motor, whereby, as shown in FIGS. 11A-11B, the screen 20 can be automatically wound by the rotational force of the driving motor 410. As described above, according to the cordless blind device 1 that is automatically wound, as shown in FIGS. 12A-12B, when the screen 20 is completely wound, the driving motor 410 is stopped by control that senses the load on the driving motor 410 described above and equilibrium of force is made again with the external force removed, so the winding roll 10 can be maintained in the stop state at that position.

As described above, it is possible to control the screen 20 to automatically wind or unwind using manual control by a user as a kind of operation signal. It is possible to more conveniently operate the cordless blind device 1 through this automatic control. Further, even if the lifespan of the battery is reached and automatic operation is not performed, equilibrium of force may be removed by applying a slight external force, so it is possible to freely operate the cordless blind device 1 manually or semi-automatically. Further, if necessary, it is possible to conveniently operate the cordless blind device 1 in a complete automatic type even without an operation signal such as manual control by automatically remotely controlling the driving motor 410 using a remote controller, etc.

Although exemplary embodiments of the present invention were described above with reference to the accompanying drawings, those skilled in the art would understand that the present invention may be implemented in various ways without changing the necessary features or the spirit of the prevent invention. Therefore, the embodiments described above are only examples and should not be construed as being limitative in all respects.

INDUSTRIAL APPLICABILITY

The cordless blind device of the present invention had the advantage that it can be very conveniently operated without a pulling string and can be selectively operated, if necessary, in various operation types such as manual, semiautomatic, and automatic types, using the driving structure of the blind device, without a cord. Therefore, according to the present invention, it is possible to conveniently operate the cordless blind device by removing the structural and functional problems and inconvenience in use due to a cord that is used in the related art, and it is also possible to appropriately operate the cordless blind device in various types such as manual, semiautomatic, and automatic types, depending on situations. According to the present invention has high industrial applicability.

REFERENCE SIGNS LIST

1: cordless blind device
10: winding roll
10a: guide protrusion
11: frame
11a: horizontal frame
11b: vertical frame
11c: connector
12: battery box
20: screen
21: weight
30: torsion spring
31: first rotary block
31a: coupling groove
32: first fixed block
40: rotation conversion unit
41: second rotary block
41a: coupling protrusion
41b: shaft coupling portion
42: second fixed block
43: housing
110, 120: rotary ring
410: driving motor
411: encoder
412: control module
420: rotation conversion module
421: first rotary element
421a: first sun gear
422: second rotary element
422a: second planetary gear
422b: second rotary plate
422c: connection shaft
423: intermediate rotary unit
423a: first planetary gear
423b: first rotary plate
423c: second sun gear
424: ring gear unit
424a: ring gear
430: shaft member
431: first fixed portion
432: second fixed portion
A, B: driving force transmission direction

The invention claimed is:
1. A cordless blind device comprising:
a winding roll coupled to a rotary shaft;
a screen being wound on or unwound from the winding roll;
a driving motor configured to provide a rotational driving force to the winding roll to wind or unwind the screen;
a weight connected to a lower end of the screen and applying torque to the winding roll using gravity in a first direction in which the screen is unwound;
a torsion spring applying torque in a second direction in which the screen is wound by applying elasticity to the winding roll; and
a rotation conversion module coupled between the driving motor and the winding roll and transmitting power in two directions by transmitting the rotational driving force provided from the driving motor to the winding roll or by transmitting the torque provided from the torsion spring to the winding roll,
wherein when the driving motor does not generate the rotational driving force, the torque applied by the torsion spring, the torque applied by the weight, and friction resistance by the rotation conversion module and the driving motor make equilibrium, such that the screen remains stopped, and when an external force is applied upward or downward to the weight, the equilibrium of the forces breaks, such that the screen is wound on or unwound from the winding roll.

2. The cordless blind device of claim 1, wherein the torque applied by the torsion spring is set larger than a resultant force of the friction resistance of the rotation conversion module and regenerative resistance of the driving motor.

3. The cordless blind device of claim 1, wherein the rotation conversion module includes a first rotary element connected to the driving motor to rotate together, a second rotary element connected to the winding roll to rotate, and an intermediate rotary unit disposed between the first rotary element and the second rotary element to transmit power.

4. The cordless blind device of claim 1, wherein the first rotary element and the second rotary module are coaxially arranged, and the intermediate rotary unit reduces and transmits a rotational speed of the first rotary element to the second rotary element.

5. The cordless blind device of claim 3, wherein the first rotary element includes: a first sun gear; the intermediate rotary unit includes a plurality of first planetary gears revolving around the first sun gear, a first rotary plate to which rotary shafts of the first planetary gears are coupled, and a second sun gear coupled to a side, opposite to another side to which the first planetary gears are coupled, of the first planetary plate; and the second rotary element includes a plurality of second planetary gears revolving around the second sun gear and a second rotary plate to which rotary shafts of the second planetary gears are coupled.

6. The cordless blind device of claim 5, further comprising a ring gear to which the first planetary gears and the second planetary gears are both inscribed.

7. The cordless blind device of claim 5, further comprising a rotary block having an outer surface coupled to an inner surface of the winding roll to rotate together, and having a rotary shaft coupled to the second rotary element.

8. The cordless blind device of claim 1, further comprising:
an encoder sensing rotation of at least any one of the winding roll and the driving motor; and
a control module driving the driving motor when the encoder senses the rotation.

9. The cordless blind device of claim 8, wherein the control module stops the driving motor when an instantaneous load increases while the driving motor operates.

10. The cordless blind device of claim 1, further comprising a control module controlling the driving motor, and rotating the driving motor when an electromotive force is generated in the driving motor.

* * * * *